C. G. TARKINGTON.
CONTROL SYSTEM FOR ELECTRIC MOTORS.
APPLICATION FILED MAY 9, 1911.
1,107,555.
Patented Aug. 18, 1914.
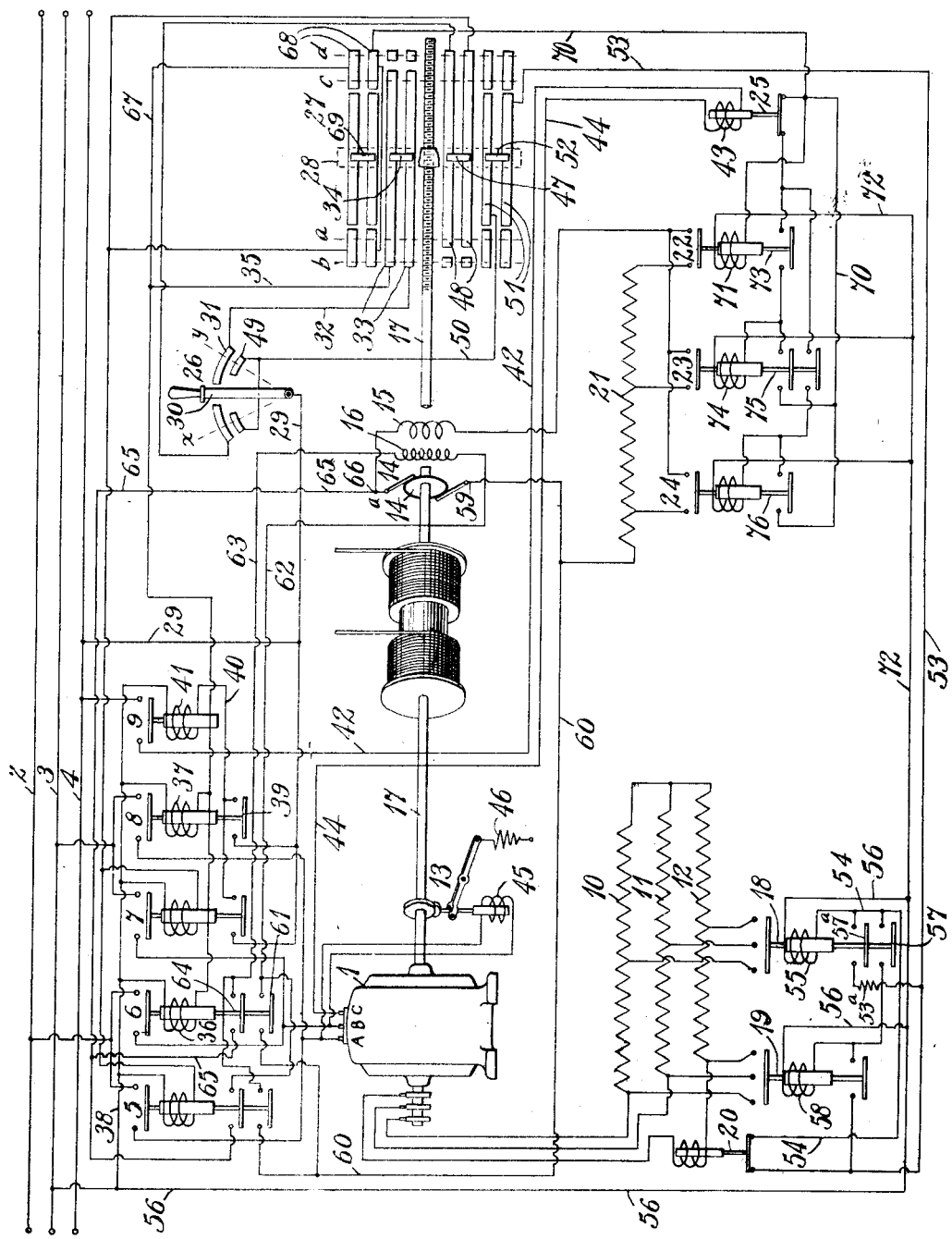
WITNESSES:
INVENTOR
Clarence G. Tarkington
BY
ATTORNEY

UNITED STATES PATENT OFFICE.

CLARENCE G. TARKINGTON, OF CHICAGO, ILLINOIS, ASSIGNOR TO WESTINGHOUSE ELECTRIC AND MANUFACTURING COMPANY, A CORPORATION OF PENNSYLVANIA.

CONTROL SYSTEM FOR ELECTRIC MOTORS.

1,107,555.  Specification of Letters Patent.  Patented Aug. 18, 1914.

Application filed May 9, 1911. Serial No. 626,130.

*To all whom it may concern:*

Be it known that I, CLARENCE G. TARKINGTON, a citizen of the United States, and a resident of Chicago, in the county of Cook and State of Illinois, have invented a new and useful Improvement in Control Systems for Electric Motors, of which the following is a specification.

My invention relates to systems of electric motor control and it has special reference to the control of such alternating current motors as are adapted to drive skip hoists, or other apparatus, in which it is desirable to automatically stop the motor at predetermined limits and bring the driven member to rest at substantially the same point, irrespective of the load under which the motor is operated.

The object of my invention is to provide a system of the character above indicated that shall be relatively simple in arrangement and reliable in operation.

When a direct current motor has heretofore been employed for operating a skip hoist and for similar purposes, a controller has been utilized to introduce a resistance in shunt circuit relation to the armature of the motor when the loaded car nearly reached the limit of its movement path, in order to slow down the car without decreasing the torque of the motor and, consequently, to bring it to rest at the same point, irrespective of the load carried by it.

According to my present invention, I utilize an alternating current motor in conjunction with a direct current generator of relatively small capacity which is operatively connected thereto, and I so vary the field strength and the load of the generator as to slow down the motor and stop the car at the proper time.

The single figure of the accompanying drawing is a diagrammatic view of a control system embodying my invention.

Referring to the drawing, alternating current energy is supplied from any suitable source to a motor 1, through conductors 2, 3 and 4, and electrically operated switches 5, 6, 7, 8 and 9. The motor is provided with external secondary resistance sections 10, 11 and 12, and a brake 13, a direct current generator 14, having an armature 14ª, a series field winding 15 and a shunt field winding 16 being operatively connected to the motor by a common shaft 17. The resistance sections 10, 11 and 12 may be gradually short circuited by switches 18 and 19 which are governed by a relay switch 20.

The generator may be loaded by a resistance 21, controlled by switches 22, 23 and 24 which are governed by a relay switch 25. The switches 5 to 9, inclusive, are governed by a master switch 26, while the primary and secondary circuits of the motor 1 and the circuits of the generator 14 may be governed automatically by means of a limit switch 27 when the car of the skip hoist or other driven member reaches predetermined points in its movement path in either direction.

The master switch 26 is adapted to occupy either of two positions X and Y, and the limit switch 27 comprises a movable contact-bearing member 28 which occupies an intermediate position during operation of the motor, but is automatically moved into positions $c$ and $d$ as the car approaches one limit of its movement path and is moved into positions $a$ and $b$ as the car approaches the opposite limit of such path.

Assuming that the master switch occupies its intermediate "off" position and that the limit switch occupies position $b$, if the master switch is now thrown to the position Y, circuit connections will be established as follows: from line conductor 4, through conductor 29, moving contact arm 30, contact member 31, conductor 32, contact members 33 of the limit switch 1 which are bridged by the contact member 34, conductor 35, coils 36 and 37 of switches 6 and 8 and conductor 38 to line conductor 3. Switches 6 and 8 are consequently closed and a circuit is established from conductor 29, through auxiliary switch 39, which forms a part of switch 8, conductor 40, coil 41 of switch 9 and conductor 38 to line conductor 3. The switch 9 is thus closed as soon as the switches 6 and 8, which determine the direction of motor rotation, are closed. Line conductor 2 is now connected through switch 6 to terminal B of motor 1, line conductor 3 is connected through switch 8 to terminal A and line conductor 4 is connected through switch 9, conductor 42, coil 43 of relay switch 25 and conductor 44 to terminal C. Coil 45, which acts in opposition to a spring 46 and releases the brake, is energized, since it is connected across the terminals A and B. The motor is now started in such direction as to move the contact-bearing member 28 of the limit switch 27 from position $b$ toward the positions $a$, $c$ and $d$.

When the limit switch occupies position $b$, it is impossible to start the motor in the reverse direction to that just described since the circuit through the closing coils of the switches 5 and 7 depend, not only upon the position of the master switch, but also upon the engagement of contact member 47 with contact members 48 of the limit switch. However, as soon as the limit switch occupies position $a$, the reversal of the motor is under the control of the operator and may be governed by the master switch.

Assuming that the motor continues to rotate and that the limit switch passes from position $a$ into its intermediate position, a circuit is established from conductor 29, through contact arm 30 and contact member 49 of the master switch, conductor 50, contact members 51, which are now bridged by contact member 52 of the limit switch, conductor 53, relay switch 20, which is closed as soon as the first rush of current in the secondary circuit of the motor has subsided, conductor 54, coil 55 of switch 18, and conductor 56 to line conductor 3.

When coil 55 is energized, switch 18 is closed and portions of the resistance sections 10, 11 and 12 are short circuited. The switch, when closed, is independent of the relay switch 20 since a holding circuit is established from conductor 53 through a resistance 53ª, an auxiliary switch 57ª, and the coil 55 to conductor 2. The sudden increase in current in the secondary circuit of the motor will usually open the switch 20 temporarily and, when it is again closed, circuit is completed from conductor 54, through auxiliary switch 57, which forms a part of switch 18, coil 58 of switch 19 and conductor 56 to line conductor 3. The switch 19, when closed, completely short circuits the resistance sections 10, 11 and 12 and permits the motor to operate at full speed. Sufficient energy cannot be supplied through the resistance 53ª to close the switch 19 and it is therefore evident that the relay switch 20 will delay the action of the switch 19 and produce a gradual acceleration of the motor.

The shunt field 16 of the generator 14 is energized in the one or the other direction according to which of the switches 5 and 6 is closed. Under the conditions above described, a circuit is completed from terminal 59 of the generator armature, through conductor 60, auxiliary switch 61, which forms a part of switch 6, conductor 62, shunt field 16, conductor 63, auxiliary switch 64 of switch 6, and conductor 65 to armature terminal 66. No load is applied to the generator, its armature circuit being interrupted except as it is completed through a shunt field, until the limit switch occupies position $c$.

If it is now assumed that the car of the skip hoist approaches the end of its movement path, the limit switch is so proportioned as to move into position $c$. A circuit is established through master switch 26, conductor 32, contact members 33 of the limit switch, conductor 35, conductor 67, contact members 68, which are bridged by movable contact members 69, conductor 70, coil 71 of switch 22, conductor 72 and conductor 56 to line conductor 3. The switch 22 is closed, since coil 71 is energized, and a circuit is established from terminal 59 of generator 14, through resistance 21, switch 22 and series field winding 15 to generator terminal 66.

As soon as the load is applied to the generator, as above indicated, the current traversing the motor circuit and the coil 43 of the relay switch 25 will be increased sufficiently to open the relay switch and, as the motor is slowed down, this current will gradually be decreased until the relay switch is closed. Circuit is then established from conductor 70, through relay switch 25, auxiliary switch 73, which forms a part of the switch 22, coil 74 of switch 23 and conductors 72 and 56 to line conductor 3. The switch 23 is closed as soon as coil 74 is energized and short circuits a portion of the resistance 21, thereby increasing the load on the generator 14 and again causing the relay switch 25 to open. When the motor has been slowed down sufficiently and the relay switch has again closed, switch 24 is permitted to close and the resistance 21 is still further reduced. The coils 74 of the switches 23 and 24 are rendered independent of the relay switch 25 as soon as the switches are closed, circuits being completed from conductor 70, through auxiliary switches 75 and 76 in the usual manner. The speed of the motor is now very much reduced and the limit switch is so proportioned that its moving member comes into position $d$. The connection between contact members 33 is then broken and the line switches 6, 8 and 9 are opened. As soon as the supply of energy to the motor primary is discontinued, the brake magnet coil 45 is deënergized and spring 46 sets the mechanical brake, thereby bringing the motor to a standstill. The motor can only be re-started in the opposite direction of rotation, this action being accomplished by throwing the master switch to position X. The cycle of operation in the reverse direction is similar, in all respects, to that already described.

Variations in the arrangement and circuit connections of the system may be effected within the spirit and scope of my invention, and I desire that only such limitations shall be imposed as are indicated in the appended claims.

I claim as my invention:

1. A control system comprising a driven member, an alternating current driving motor connected thereto, a direct current generator operatively connected to the motor and automatic means for establishing a load circuit for the generator, gradually decreasing the resistance of said circuit and interrupting the supply of energy to the alternating current motor at a predetermined limit in the movement of the driven member.

2. A control system comprising an alternating current motor, a generator and a limit switch operatively connected thereto, and automatic means that is set in operation by the limit switch for successively establishing a load circuit for the generator and interrupting the motor circuit at predetermined limits of motor operation.

3. A control system comprising a driven member, a motor operatively connected thereto, a generator, means for establishing a generator load circuit and controlling the generator load, and means dependent upon the current traversing the motor circuit for automatically delaying the increase in the generator load.

4. In a hoist controller, the combination with an alternating current driving motor, a generator operatively connected thereto and a limit switch for establishing the generator circuit, of automatic means dependent upon the current traversing the primary circuit of the motor for reducing the resistance in the generator circuit.

5. In a control system, the combination with a driven member, an alternating current electric motor, a direct current generator and a limit switch, the driven member, the generator and the moving element of the limit switch being operatively connected to the motor, of means dependent upon the limit switch for completing a load circuit of the generator, and means dependent upon the current traversing the motor circuit for governing the generator load.

6. In a control system, the combination with an alternating current supply circuit, a motor and independently operated switches for connecting the motor to the circuit and determining the direction of motor rotation, of a direct current generator operatively connected to the motor, means for completing a generator load circuit at predetermined limits in the operation of the motor.

7. In a control system, the combination with an alternating current supply circuit, a motor and independently operated switches for connecting the motor to the circuit and determining the direction of motor rotation, of a direct current generator operatively connected to the motor, means for completing a generator load circuit at predetermined limits in the operation of the motor, and means dependent upon the current traversing the motor circuit for governing the generator load.

8. In a control system, the combination with an alternating current supply circuit, a motor and independently operated switches for connecting the motor to the circuit and determining the direction of motor rotation, of a direct current generator operatively connected to the motor, of a limit switch operatively connected to the motor and adapted to successively connect a resistance across the armature of the generator and interrupt the motor circuit, and means dependent upon the current traversing the motor circuit for delaying the action of the last named means.

9. In a system of control, the combination with a polyphase alternating current supply circuit, an induction motor having external secondary resistances and independently operated switches for connecting the motor to the circuit and determining the direction of motor rotation, of a direct current generator, a limit switch having a movable member operatively connected to the motor, a shunt field winding for the generator that is dependent upon the reversing switches of the motor, a resistance for the generator armature circuit that is dependent upon the limit switch, independently operated switches for respectively short circuiting the secondary resistances of the motor and the armature resistance of the generator, means dependent upon the current traversing the secondary circuit of the motor for delaying the motor secondary resistance switches, and means dependent upon the current traversing the primary circuit of the motor for governing the generator resistance switches.

In testimony whereof, I have hereunto subscribed my name this 18th day of April 1911.

CLARENCE G. TARKINGTON.

Witnesses:
CLARENCE T. WEIR,
D. B. HUTCHINSON.